United States Patent [19]
Dovan et al.

[11] Patent Number: 5,211,858
[45] Date of Patent: May 18, 1993

[54] LANTHANIDE-CROSSLINKED POLYMERS FOR SUBTERRANEAN FLUID CONTAINMENT

[75] Inventors: Hoai T. Dovan, Yorba Linda; Richard D. Hutchins, Placentia, both of Calif.

[73] Assignee: Union Oil Company of California, Los Angeles, Calif.

[21] Appl. No.: 842,215

[22] Filed: Feb. 26, 1992

Related U.S. Application Data

[62] Division of Ser. No. 696,625, May 7, 1991, Pat. No. 5,111,886.

[51] Int. Cl.$^5$ .................... E02D 29/00; C09K 3/00
[52] U.S. Cl. .................... 252/8.551; 405/264; 166/295; 523/130; 588/250; 588/252; 588/255
[58] Field of Search .................... 405/264; 252/8.551; 523/130; 166/295

[56] References Cited

U.S. PATENT DOCUMENTS

| | | | |
|---|---|---|---|
| 3,475,334 | 10/1969 | Boudreaux | 166/308 X |
| 4,291,069 | 9/1981 | Pilny | 405/264 X |
| 4,391,555 | 7/1983 | Burger et al. | 405/264 |
| 4,460,292 | 7/1984 | Durham et al. | 405/129 |
| 4,488,975 | 12/1984 | Almond | 252/8.55 R |
| 4,497,663 | 2/1985 | Fisher et al. | 134/4 |
| 4,552,215 | 11/1985 | Almond et al. | 166/278 |
| 4,553,601 | 11/1985 | Almond et al. | 166/308 |
| 4,640,358 | 2/1987 | Sampath | 166/274 |
| 4,647,312 | 3/1987 | Sampath | 252/8.551 X |
| 4,790,688 | 12/1988 | Castor | 405/128 |
| 4,960,527 | 10/1990 | Penny | 166/300 X |
| 4,982,793 | 1/1991 | Holtmyer et al. | 166/300 X |
| 5,062,969 | 11/1991 | Holtmyer et al. | 252/8.551 |
| 5,111,886 | 5/1992 | Dovan et al. | 166/300 |

FOREIGN PATENT DOCUMENTS

| | | |
|---|---|---|
| 166529 | 12/1976 | Czechoslovakia . |
| 0057479 | 8/1982 | European Pat. Off. . |
| 2474558 | 7/1981 | France . |

OTHER PUBLICATIONS

Allen et al., *Production Operations*, Third Edition, vol. 2, pp. 125-244.
Harris, SPE Distinguished Author Series, Journal of Petroleum Technology, Oct. 1988, pp. 1277-1279.
Howard et al., *Hydraulic Fracturing*, Society of Petroleum Engineers of AIME, New York, NY (1970), Chapters 2 and 6.
Williams et al., Acidizing Fundamentals, Society of Petroleum Engineers of AIME, New York, NY (1979), Chapters 2, 3, 5, and 11.
H. K. van Poollen and Associates, Inc., *Fundamentals of Enhanced Oil Recovery*, PennWell Books Pub. Co., (1980), Chapter 6.

*Primary Examiner*—Gary L. Geist
*Attorney, Agent, or Firm*—Gregory F. Wirzbicki; Shlomo R. Frieman

[57] ABSTRACT

Polymers (and especially hydroxyethylcellulose) are crosslinked using a lanthanide as a crosslinking agent. The crosslinked polymers have utility in well completion, well stimulation, enhanced oil recovery, and subterranean fluid containment operations.

19 Claims, No Drawings

LANTHANIDE-CROSSLINKED POLYMERS FOR SUBTERRANEAN FLUID CONTAINMENT

This application is a division of application Ser. No. 07/696,625, filed May 7, 1991, now U.S. Pat. No. 5,111,886.

BACKGROUND

The present invention relates to (a) crosslinked polymers and (b) compositions and methods for (i) crosslinking polymers, (ii) gravel packing well bores, (iii) fracturing subterranean formations, (iv) conforming the penetration depth of a subterranean acidizing procedure, (v) conforming the penetration depth of a subterranean caustic flooding procedure, (vi) inhibiting the migration of a hazardous acid plume in a subterranean stratum, and (vii) reducing the water permeability of subterranean formations to improve the recovery of hydrocarbons.

Polymers are extensively used in well completion and enhanced oil recovery procedures. In many of these procedures, e.g., fracturing, gravel packing, and subterranean formation permeability modification operations, it is preferred to employ crosslinked polymers.

Hydroxyethylcellulose (HEC) is very desirable for use in, inter alia, fracturing and gravel packing operations because the polymer breaks cleanly, i.e., does not cause formation damage or otherwise adversely interfere with the subterranean flow of hydrocarbons. However, heretofore, HEC has been virtually impossible to crosslink. To overcome this problem, U.S. Pat. 4,552,215 and U.S. Pat. No. 4,553,601 describe a HEC crosslinking method that requires the additional cost of initially chemically modifying the HEC by incorporating therein a pendant vicinal dihydroxy structure or a pendant aromatic polyol having at least two hydroxyl groups located on adjacent carbon atoms. The modified HEC is then crosslinked using a crosslinking agent selected from titanium (IV), zirconium (IV), antimony (III), antimony (V), boron (III), lead (II), aluminum (III), arsenic (III), chromium (III), and niobium (V), wherein the Roman numerals indicate the respective oxidation state of each of the foregoing ions.

SUMMARY OF THE INVENTION

The present invention provides a method for readily crosslinking HEC. In one version of the invention, the crosslinking method entails raising the pH of an acidic solution (generally having a pH of less than about 5) containing HEC and a lanthanide. Another version entails reacting HEC and a sequestered lanthanide in an aqueous solution (typically having a pH of about 5 to about 9) to form crosslinked HEC. In addition, acidic solutions and aqueous solutions containing other polymers and a lanthanide or a sequestered lanthanide are also crosslinkable using analogous procedures.

The solutions of the present invention are useful, for example, as fracturing and gravel packing fluids. When used as a fracturing fluid, the solutions preferably further contain a proppant. A particulate agent suitable for use in forming a gravel pack is present in solutions employed as a gravel packing fluid.

Furthermore, the present invention includes procedures for conforming the penetration depth of a subterranean formation acidizing operation. In one version, the penetration depth of a subterranean formation acidizing operation is conformed by sequentially injecting into the formation a slug of the polymer- and lanthanide-containing acidic solution followed by a slug of an acidizing fluid. In another version, a slug of a crosslinkable-polymer-containing acidizing fluid and a slug of a lanthanide-containing acidizing fluid are sequentially injected into the subterranean formation.

Also encompassed by the present invention is a technique for conforming the penetration depth of a subterranean formation caustic flood procedure. In one embodiment, the penetration depth of the caustic flooding procedure is conformed by sequentially injecting into the formation a slug of one of the solutions of the present invention, a spacer fluid slug, and a slug of a caustic flood fluid. In addition, the breakthrough of a caustic flood at a producer well is inhibited or blocked by sequentially injecting into the formation through the producer well a slug of a spacer fluid, a slug of one of the solutions of the present invention, and another slug of the spacer fluid.

An additional aspect of the invention encompasses techniques for inhibiting the migration of a hazardous acid plume (such as leachate from a toxic landfill) through a subterranean stratum. One hazardous acid plume migration inhibition technique entails injecting into the acid plume a slug of one of the solutions of the present invention. Alternatively, the migration of a hazardous acid plume is inhibited by injecting a slug of a solution of this invention into at least a portion of the subterranean formation not contacted by the acid plume but in the migration path of the acid plume.

DETAILED DESCRIPTION OF THE INVENTION

In one embodiment of the present invention, crosslinked polymers are formed by raising the pH of an acidic solution comprising a polymer and a lanthanide, while in another embodiment the crosslinking takes place by mixing the polymer with a sequestered lanthanide. Exemplary polymers crosslinkable by the foregoing processes include polyvinyl polymers, cellulose ethers, polysaccharides, lignosulfonates, ammonium salts thereof, alkali metal salts thereof, as well as alkaline earth salts of lignosulfonates. Specific examples of typical water soluble polymers are acrylic acid-acrylamide copolymers, acrylic acid-methacrylamide copolymers, polyacrylamides, polymethacrylamides, partially hydrolyzed polyacrylamides, partially hydrolyzed polymethacrylamides, polyvinyl alcohol, polyvinyl acetate, polyvinyl pyrrolidone, polyalkyleneoxides, carboxycelluloses, carboxyalkylhydroxyethyl celluloses, HEC, substituted HEC, galactomannans (e.g., guar gum), substituted galactomannans (e.g., hydroxypropyl guar (HPG)), heteropolysaccharides obtained by the fermentation of starch-derived sugar (e.g., xanthan gum), and ammonium and alkali metal salts thereof. Because of its desirable properties when used in well completion and enhanced oil recovery techniques, HEC is the preferred polymer employed in the many of the well completion and enhanced oil recovery processes of this invention. In addition, as noted above, heretofore it has been very difficult, if not impossible, to crosslink HEC to form an aqueous-based gel.

The HEC employed in the present invention is preferably substantially devoid, more preferably virtually devoid, and most preferably totally devoid of pendant vicinal dihydroxy groups, pendant aromatic polyols having at least two hydroxyl groups located on adjacent carbon atoms, or other pendant group not indigenous to HEC. As used in the specification and claims, the term "substantially devoid" means that the degree of substitution (DS) of the nonindigenous pendant groups on the HEC is less than about 0.01. The term "virtually devoid" means that the DS of the nonindigenous pendant groups on the HEC is less than about 0.001. In addition, the HEC typically has a molar substitution (MS) of about 1.5 to about 3.5.

The polymer is generally present in the solutions of the present invention in a concentration of at least about 1,000 ppm. The preferred polymer concentration of the solutions depends on the intended use of the respective solutions. For example, when intended for use in conforming the penetration depth of a subterranean formation acidizing procedure, the acidic solution preferably contains about 1,000 to about 10,000 ppm polymer, more preferably about 2,000 to about 9,000 ppm polymer, and most preferably about 3,000 to about 8,000 ppm polymer.

However, when designed for use as fracturing and gravel packing fluids as well as a fluid for conforming the penetration depth of a caustic flood or inhibiting a caustic flood breakthrough at a production well, the acidic or aqueous solution preferably has a polymer concentration of about 2,500 to about 10,000 ppm (about 20 to about 85 pounds of polymer per 1,000 gallons of water), more preferably about 3,500 to about 7,500 ppm (about 30 to about 60 pounds of polymer per 1,000 gallons of water), and most preferably about 4,000 to about 6,000 ppm (about 35 to about 50 pounds of polymer per 1,000 gallons of water).

The molecular weight of the polymer is variable with the preferred ranges being dependent on the specific polymer employed and the intended use of the respective solution of the invention. The general and preferred polymer molecular weight ranges for the various polymers in the various applications are similar, if not identical, to the molecular weight ranges employed by those skilled in the art in preparing fluids (such as fracturing fluids and gravel pack fluids) for corresponding applications.

Regarding the term "lanthanide," as used in the specification and claims, this term means the group of elements having atomic numbers 57 through 71, namely, lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). The lanthanides are used individually or admixed. Preferably, the lanthanide is selected from the group consisting of La, Ce, and mixtures thereof, with La being the lanthanide of choice.

The lanthanide concentration in the solutions of the invention is usually at least about 10 ppm, preferably at least about 25 ppm, more preferably at least about 50 ppm, and most preferably at least about 75 ppm. Typically, about 100 to about 2,000 ppm of lanthanide is present in the respective solution. Preferably, the lanthanide is present in the acidic and aqueous solutions in a concentration of about 100 to about 1,000 ppm, more preferably about 120 to about 800 ppm, and most preferably about 150 to about 750 ppm.

The acidic solution generally has a pH of less than about 5. The preferred pH of the acidic solution also varies depending on the intended end use of the acidic solution. In the case of an acidic solution intended for use in an acidizing procedure, the pH of the solution is preferably less than about 3, more preferably less than about 2, and most preferably less than about 1. For fracturing, gravel packing, and caustic flood applications, the pH of the acidic solution is preferably about 1 to about 4, more preferably about 1 to about 3, and most preferably about 1 to about 2.

Strong acids are usually employed in forming the acidic solutions of the present invention. Exemplary strong mineral acids are hydrochloric acid, hydrofluoric acid, nitric acid, orthophosphoric acid, sulfurous acid and sulfuric acid. Common strong organic acids include, but are not limited to, oxalic acid, formic acid, lactic acid, acetic acid, and citric acid. Mineral acids are the preferred strong acids.

The pH of the aqueous solution of this invention is typically greater than about 5. As in the case of the acidic solution, the preferred pH of the aqueous solution also varies depending on the intended end use of the aqueous solution. In general, the aqueous solution has a pH of about 5 to about 9, preferably about 5.5 to about 8.5, and more preferably about 6.5 to about 7.5.

The solutions of the present invention optionally contain one or more additional ingredients such as gel breakers, sequestering agents, proppants suitable for use in hydraulically fracturing subterranean formations, particulate agents suitable for use in forming a gravel pack, and corrosion inhibitors. Typical gel breakers include, but are not limited to, enzymes (e.g., alpha and beta amylases, amyloglucosidase, invertase, maltase, cellulase, and hemicellulase) and free radical generators (e.g., ammonium persulfate, potassium dichromate, and potassium permanganate). The gel breaker concentrations employed in the solutions of the present invention are substantially the same as employed by those skilled in the art in forming fluids for corresponding end uses.

Exemplary sequestering agents are glutaric acid, glycolic acid, iminodiacetic acid, glucoheptonate, pentetic acid, citrate, nitrilotriacetic acid, edetic acid, adipic acid, and succinic acid. Iminodiacetic acid is the preferred sequestering agent.

The molar ratio of sequestering agent to lanthanide, when one or more sequestering agents are employed, is generally at least about 1:1. The preferred molar ratio depends on the desired polymer-lanthanide reaction rate. As a rule of thumb, the higher the sequestering agent-lanthanide molar ratio, the slower the polymer-lanthanide reaction rate and the longer it takes to form a gel. Usually, the preferred molar ratio is at least about 2:1, with the more preferred molar ratio being at least about 3:1. Generally, the sequestering agent-lanthanide molar ratio is less than about 50:1.

While sequestering agents are optionally used in the polymer- and lanthanide-containing acidic solutions, their presence is very important in the aqueous solutions of the present invention. Sequestering agent-containing aqueous solutions, upon gelation, yield substantially uniform gels as opposed to pockets of gels in an aqueous environment.

Common proppants suitable for use in hydraulically fracturing subterranean formations are quartz sand grains, tempered glass beads, sintered bauxite, resin coated sand, aluminum pellets, and nylon pellets. Generally, the proppants are employed in the solutions of the present invention intended for use as fracturing fluids and are used in concentrations of roughly about 1 to about 10 pounds per gallon of fracturing fluid. The proppant size is typically less than about 2 mesh on the U.S. Sieve Series scale, with the exact size selected being dependent on the particular type of formation to be fractured, the available pressure and pumping rates, as well as other factors known to those skilled in the art.

Typical particulate agents employed in the solutions of the present invention used as gravel packing fluids include, but are not limited to, quartz sand grains, glass beads, synthetic resins, resin coated sand, walnut shells, and nylon pellets. The gravel pack particulate agents are generally used in concentrations of about 1 to about 20 pounds per gallon of gravel packing fluid. The size of the particulate agent employed depends on the type of subterranean formation, the average size of formation particles, and other parameters known to those skilled in the art. Generally, particulate agents of about 8 to about 70 mesh on the U.S. Sieve Series scale are used.

One exemplary process for preparing the solutions of the present invention is as follows. Before mixing any chemicals into the water employed in making the solution, the water is generally filtered to prevent any suspended solids from damaging the formation by plugging the wellbore. Typically, the first chemicals added to the water are any required salts (such as potassium or calcium chloride). The salts are generally employed to prevent clay problems in the formation and/or to help stabilize the resulting crosslinked polymer or gel.

In order for the polymer to experience a high degree of turbulence during the initial mixing stage, solid polymers and liquid-based polymers are usually added to the water through an eductor or a positive displacement pump, respectively. When desired, further mixing is achieved using either centrifugal pumps or other forms of agitation. For gravel packing operations, the polymer solution is preferably additionally filtered through a diatomaceous earth filter and a final polish filter of about 1-5 micron rating.

Once the polymer is completely mixed into the water, the optional additives, when employed, are added to the mixing tank containing the aqueous polymer solution. Any solid additives are first dissolved in water before they are added to the polymer solution.

Frequently, the last chemical added to the mixing tank is the lanthanide crosslinking agent. When forming an acidic solution, the lanthanide is first dissolved in a strong acid (typically having a pH of less than about 1). In forming an acidic solution, a sufficient amount of one or more sequestering agents is optionally also added to the strong acid to achieve the desired sequestering agent-lanthanide molar ratio. A sufficient amount of lanthanide-containing (or sequestering agent- and lanthanide-containing) strong acid composition is then added to the polymer solution in the mixing tank to obtain an acidic solution having the desired pH and lanthanide concentration. The lanthanide-containing (or sequestering agent- and lanthanide-containing) strong acid composition is capable of being added to the polymer solution "on the fly," i.e., by introducing the composition into the polymer solution as the solution is being transported through an injection line to the well bore.

Exemplary lanthanides employed in forming the acidic solution are lanthanum oxide, lanthanum chloride, lanthanum carbonate octahydrate, lanthanum sulfate, lanthanum nitrate, ceric fluoride, ceric oxide, ceric sulfate, cerous carbonate, cerous chloride, cerous iodide, cerous oxalate, cerous sulfate, praseodymium chloride, neodymium oxide, neodymium chloride, neodymium sulfate, samarium sulfate, europic chloride, europic sulfate, gadolinium chloride, gadolinium sulfate, gadolinium nitrate, terybium chloride hexahydrate, dysprosium nitrate, erbium oxide, erbium chloride, erbium sulfate, thulium oxide, thulium chloride heptahydrate, ytterbium oxide, and lutetium sulfate.

The acidic solution forms a gel when the pH of the solution exceeds a certain minimum threshold gelling pH. The minimum threshold gelling pH of a specific acidic solution is dependent on the particular lanthanide employed therein. For example, when the lanthanide is lanthanum, the crosslinking reaction commences at a pH of about 2, and when the crosslinking agent is cerium, the polymer begins to crosslink at about pH 4. It is preferred to increase the pH about one or more pH units above the crosslinking pH threshold to ensure gelation. The pH of the acidic solution is increased in the formation by the acidic solution mixing with indigenous subterranean water and/or by being spent by reacting with minerals present in the formation. When desired, the pH of the acidic solution is also raised by releasing a base, e.g., through coiled tubing, at a preselected depth in the well bore.

To prepare an aqueous solution of the present invention, the lanthanide and a sufficient amount of one or more sequestering agents are first dissolved in water to achieve the desired sequestering agent-lanthanide molar ratio. An adequate amount of the resulting sequestering agent- and lanthanide-containing composition is then added to the polymer solution in the mixing tank to obtain an aqueous solution having the desired lanthanide concentration.

The pH of the aqueous solution is adjusted, when necessary, to the desired level by the addition of an acid or base. Preferably, the pH is adjusted using a dilute acid or base, e.g., dilute hydrochloric acid or dilute sodium hydroxide, respectively.

The lanthanide employed in forming the aqueous solution of the present invention must be soluble in a aqueous medium. Such water soluble lanthanides include, but are not limited to, lanthanum chloride, lanthanum sulfate, lanthanum nitrate, cerous chloride, cerous iodide, cerous sulfate, praseodymium chloride, neodymium oxide, neodymium chloride, neodymium sulfate, samarium sulfate, europic chloride, europic sulfate, gadolinium chloride, gadolinium sulfate, gadolinium nitrate, terbium chloride hexahydrate, dysprosium nitrate, erbium oxide, erbium chloride, erbium sulfate, thulium chloride heptahydrate, and lutetium sulfate.

The aqueous solution of the present invention forms a gel by the polymer competing with the sequestering agent for the lanthanide. Accordingly, the higher the sequestering agent-lanthanide molar ratio, the longer the onset of gelation is delayed.

Another optional additive employed in formulating the aqueous solutions of the present invention are base precursors. The more widely known base precursor classes are ammonium salts, quaternary ammonium salts, urea, substituted ureas, coordinated compounds, and salts of a strong base and a weak acid, with the preferred base precursors being urea, thiourea, ammonium chloride, and mixtures thereof. When employed, the base precursors are used in a concentration sufficient to raise the pH of the aqueous solution at least about a 0.5 pH unit, more preferably at least about 1 pH unit, and most preferably about 2 or more pH units.

The solutions of the present invention are obtained when all the desired ingredients have been mixed together. The resulting acidic or aqueous solution is then often injected into a subterranean formation through a well bore (e.g., a production or injection well) that penetrates at least a portion of the formation. The specific conditions and procedure for injecting the solutions of this invention are determined by the intended use of each solution. Some of these parameters are well known to those skilled in the art. For example, when an acidic or aqueous solution is employed as a gravel packing fluid it is typically injected into the formation in accordance with the procedure discussed in U.S. Pat. No. 4,552,215, this patent being incorporated herein in its entirety by reference. The aqueous solution of the present invention is preferably used as a gravel packing fluid.

The acidic and aqueous solutions are equally preferred for use as fracturing fluids and are usually injected into the formation using procedures analogous to those disclosed in U.S. Pat. No. 4,488,975, U.S. Pat. No. 4,553,601, Howard et al., *Hydraulic Fracturing*, Society of Petroleum Engineers of the American Institute of Mining, Metallurgical, and Petroleum Engineers, Inc., New York, N.Y. (1970), and chapter 8 of Allen et al., *Production Operations, Well completions, Workover, and Stimulation*, 3rd edition, volume 2, Oil & Gas Consultants International, Inc., Tulsa, Okla. (1989) (Allen), these publications being incorporated herein in their entirety by reference.

When injected into a subterranean formation as a fracturing fluid, it is desirable to use a base to ensure that gelation commences as soon as the injected fluid leaves the well bore. The base is preferably introduced or injected into the well bore at a depth sufficiently close to the end of the well bore for the pH of the acidic solution to rise above the minimum crosslinking pH threshold as the solution leaves the well bore. Generally, the base is injected as a liquid (e.g., ammonia or sodium hydroxide) as a or gas (e.g., ammonia gas) through tubing having an outlet at the desired injection depth.

When employed in an acidizing well stimulation procedure, the acidic solution of the present invention is preferably used. The acidic solution is injected into the subterranean formation usually after an initial injection of an acidizing fluid. Generally, a minimum of about 500 gallons of acidizing fluid are injected during the course of an entire acidizing treatment. Typically, up to approximately 30 volume percent of the entire injected acidizing fluid consists of the acidic solution of this invention. Preferably, the acidic solution comprises about 1 to about 25 volume percent of the acidizing fluid, more preferably about 5 to about 20 percent of the acidizing fluid, and most preferably about 10 to about 15 volume percent of the acidizing fluid.

The acidic solution is injected as a single slug or as a plurality of alternating slugs, with the intervening slugs being the acidizing fluid.

Aside from using the acidic solution of the present invention and the above described details particular to such usage, the acidizing procedure remains otherwise virtually unchanged. Details for conducting acidizing treatments are extensively discussed in Williams et,al., *Acidizing Fundamentals*, Society of Petroleum Engineers of the American Institute of Mining, Metallurgical, and Petroleum Engineers, Inc., New York, N.Y. (1979) and in chapter 7 of Allen, these publications being incorporated in their entirety by reference.

When injected into a subterranean formation during the course of an acidizing treatment, the acidic solution of the present invention tends to enter the more water permeable portions of the formation. As the acidic solution is diluted by mixing with indigenous subterranean water and/or spent by reacting with materials present in the formation, the pH of the solution rises and the polymer begins to crosslink once the crosslinking pH threshold is crossed. The resulting gel acts to divert any subsequently injected acidizing fluid into less water permeable portions of the formation, thereby increasing the efficiency of the acidizing treatment.

In an alternative acidizing treatment embodying features of the present invention, the acidizing treatment is conducted by preferably sequentially injecting into at least a portion of the formation a polymer-containing acidizing fluid that is generally substantially devoid of any lanthanide, a slug of a lanthanide-containing acidizing fluid, and a slug of just acidizing fluid. In this version of the invention, the polymer-containing acidizing fluid is preferably virtually devoid and more preferably totally devoid of any lanthanide. When used in conjunction with the polymer-containing acidizing fluid, the term "substantially devoid" means that the polymer-containing acidizing fluid contains less than about 0.1 ppm lanthanide and the term "virtually devoid" means that the polymer-containing acidizing fluid contains less than about 0.01 ppm lanthanide.

While the amount of the polymer and the lanthanide employed in this latter version of the invention are similar to the amounts used in the previously discussed acidizing treatment embodiment, the concentrations of the polymer and the lanthanide are approximately doubled in the respective slugs in which they are present in this version of the invention.

The polymer-containing acidizing fluid also preferably enters the more water permeable zones of the formation. When the lanthanide reaches the polymer and the pH of the fluid is raised by mixing with indigenous subterranean water and/or depleting the acid due to the acidizing fluid reacting with materials present in the formation, the lanthanide crosslinks the polymer as discussed above with similar beneficial results.

To avoid any permanent or long lasting permeability damage, the polymer selected for use in the acidic solution employed in an acidizing treatment (as well as in gravel packing and hydraulic fracturing operations) is one that preferably readily degrades at formation temperature and/or by the action of a gel breaker. HEC, HPG (especially for fracturing operations), and xanthan (especially for gravel packing procedures) are exemplary of such degradable polymers—with HEC being the most preferred because it breaks very cleanly.

However, when the acidic or aqueous solutions of the present invention are employed in conjunction with caustic flooding, caustic breakthrough prevention, and acid plume containment operations, it is preferred to use polymers that do not readily degrade at formation temperature. Exemplary preferred polymers for these procedures are polyacrylamide and copolymers of acrylamide and (a) acrylic acid, (b) vinyl pyrrolidone, (c) sodium 2-acrylamido-2-methylpropane sulfonate (sodium AMPS®), and (d) mixtures of (a), (b), and (c).

Usually, the viscosity average molecular weight of the polyacrylamide and acrylamide copolymers employed in these solutions is generally less than about 20,000,000 and preferably less than about 15,000,000. In the majority of cases, the polyacrylamide and acrylamide copolymer have a viscosity average molecular weight of at least about 1,000,000. Preferably, the viscosity average molecular weight of the polyacrylamide and acrylamide copolymer is at least about 5,000,000.

A relationship exists between the minimum desired polyacrylamide and/or acrylamide copolymer concentration, the preferred polyacrylamide and/or acrylamide copolymer concentration, and the viscosity average molecular weight of the polyacrylamide and/or acrylamide copolymer employed in the solutions used in these embodiments of the invention. In general, the concentration of polyacrylamide and acrylamide copolymer required to form a visible gel increases with decreasing molecular weight. This relationship is illustrated for polyacrylamides and acrylamide copolymers of various viscosity average molecular weights in the following Table A.

TABLE A

| Viscosity Average Molecular Weight | Minimum Desired Polyacrylamide Or Acrylamide Copolymer Concentration, ppm by weight | Preferred Polyacrylamide Or Acrylamide Copolymer Concentration, ppm by weight |
|---|---|---|
| >7,000,000 | 1,000 | 2,000–6,000 |
| 3,000,000–7,000,000 | 1,500 | 3,000–8,000 |
| 1,000,000–<3,000,000 | 2,000 | 4,000–10,000 |
| <1,000,000 | 7,000 | 9,000–30,000 |

In an exemplary procedure for conforming the penetration depth of a caustic flood, the formation in question is first pretreated with a slug of one of the solutions of the present invention. Typically, this initial slug consists of about 500 to about 2,000 barrels. To avoid immediately crosslinking the polymer present in the solutions of the invention, the caustic flood is separated from the initial slug by a spacer fluid, e.g., water. The volume of spacer fluid used is roughly about one-half the volume employed in the initial slug.

When injected into a subterranean formation during the course of a caustic flood, the solutions of the present invention tend to enter the more water permeable portions of the formation. The solutions of the present invention gel either (a) as the acidic solution is diluted by mixing with indigenous subterranean water and/or spent by reacting with materials present in the formation, (b) as the polymer competes with the sequestering agent for the lanthanide, and/or (c) when the caustic flood contacts the solution and raises its pH above the crosslinking pH threshold. The resulting gel acts to divert any subsequently injected caustic flood fluids into less water permeable portions of the formation, thereby increasing the efficiency of the caustic flood treatment.

Because a caustic flood tends to be conducted for a substantial length of time, a slug of one or more of the solutions of the present invention is periodically injected into the formation to further help ensure the uniformity of the caustic flooding treatment. The volume of solution of this invention injected in these subsequent slugs also is about 500 to about 2,000 gallons per slug. In addition, the subsequent slug of solution of this invention is sandwiched between two spacer slugs (e.g., slugs of water) to avoid premature gelling. The volume of each of these sandwiching spacer fluid slugs is approximately half the volume of the corresponding sandwiched slug of this invention.

Outside of the details involved in using the solutions of the present invention in a caustic flood, the remaining portion of the caustic flood procedure is conducted using techniques well known to those skilled in the art. Exemplary caustic flooding techniques are discussed in van Poollen et al., *Fundamentals of Enhanced Oil Recovery*, PennWell Books, Tulsa, Okla. (1980), chapter 6, this publication being incorporated herein in its entirety by reference.

Besides being used to conform the penetration depth of a caustic flood operation, the solutions of the present invention are also useable to inhibit or block a caustic flood breakthrough at a production well. In this latter version, when a caustic flood breakthrough occurs or is imminent at a production well, a slug of a spacer fluid, such as oil or other hydrocarbon, is first injected into the formation through the production well. The spacer fluid volume is roughly about 500 to about 1,000 barrels. After injecting the spacer fluid, about 250 to about 500 barrels of one of the solutions of the present invention, and preferably the acidic solution, is injected into the formation through the production well. A slug of about 500 to about 1,00 barrels of another oil or other hydrocarbon spacer fluid is employed to displace the injected solution of the present invention from the well bore and push it into the formation. When the caustic flood fluid contacts the solution of this invention, the lanthanide crosslinks the polymer to form a gel. The resulting gel inhibits, and preferably blocks, the caustic flood fluid from reaching the production well.

An interesting aspect of the caustic flooding embodiments of the present invention is that most prior art polymer crosslinking systems are incapable of gelling or, if already gelled, are not stable at the high pH employed in caustic flooding operations. In contrast, the solutions of the present invention are capable of gelling, and the resulting gels are stable, at the high pH used in caustic flooding procedures.

The solutions of the present invention are also useful for inhibiting the migration of a hazardous acid plume through a subterranean stratum of a landfill or natural subterranean formation. In one version, the acidic solution is injected through one or more well bores, e.g., observation wells, into the acid plume. The volume of acidic solution injected per well bore depends on the volume and cross-sectional area of the plume intersecting the well bore. In rough terms, about 100 to about 10,000 barrels of the acidic solution are injected per well. The pH of the acidic solution is generally less than or equal to the pH of the acid plume. The lanthanide selected for use in the acidic solution is one that is soluble at the pH of the acidic solution. The concentration of the lanthanide in the acidic solution used in this version of the invention is the same as noted above and the concentration of the polymer is generally at least about 1,000 ppm, preferably about 1,000 to about 10,000 ppm, more preferably about 2,000 to about 9,000 ppm, and most preferably about 3,000 to about 8,000 ppm.

Once in the acid plume, the acidic solution commingles with the plume, with the resulting composition gelling when the pH of the composition rises above the crosslinking pH threshold. The migration of the acid plume is inhibited by the presence of the gel in the formation or stratum.

In another version, one of the solutions of the present invention is injected through a well bore into a subterranean region or stratum outside the acid plume but in the migration path of the plume. The aqueous solution is preferably used in this version of the invention. The concentration of polymer and lanthanide employed in the aqueous solution is the same as used in the acidic solution employed in the embodiment of the invention discussed in the preceding paragraph. The molar ratio of sequestering agent to lanthanide selected depends on the length of time desired to delay the onset of gelation—the higher the molar ratio, the longer the delay. Generally, the molar ratio is at least about 3:1.

When an acidic solution is injected into the subterranean formation or stratum outside the acid plume, the composition of the solution is generally the same as when the acidic solution is injected into the acid plume. However, the pH of the acidic solution is selected to permit the desired volume of the acidic solution to be injected into the formation prior to forming a gel. In general, the volume of the acidic solution injectable into the formation prior to forming a gel is inversely proportional to the pH of the acidic solution, i.e., the lower the pH of the injected acidic solution, the greater the volume of acidic solution injectable into the formation prior to gelation. Accordingly, in this version of the invention, the pH of the injected acidic solution is preferably less than 1. Whatever the pH of the acidic solution, a gel eventually forms when the pH of the acidic solution rises above the crosslinking pH threshold by mixing with indigenous subterranean water and/or the acid being spent by reacting with indigenous formation materials.

When injecting either the acidic solution or the aqueous solution into the formation outside the acid plume, the injected volume of the solution is also roughly about 100 to about 10,000 barrels. In addition, the resulting gel obtained by injecting either the aqueous solution or the acidic solution in the migration path of the acid plum inhibits the flow of the plume past the gel blockage.

EXAMPLES

The following examples—which are for purposes of illustrating and not limiting the invention—demonstrate the formation and stability of various gels.

EXAMPLES 1-4

Crosslinking Polyacrylamide

Polyacrylamide was crosslinked in accordance with the following procedure. Lanthanum oxide and ceric sulfate were dissolved in separate solutions of about 10 weight percent sulfuric acid. The lanthanum-containing solution contained about 3,837 ppm La and the cerium-containing solution contained about 3,586 ppm Ce. Both solutions had a pH of about 0.

Pusher 700E brand polyacrylamide (available from Dow Chemical Co.) was dissolved in water. The resulting solution contained about 4,666 ppm polyacrylamide and had a pH of about 7.

An aliquot (about 1 ml) of one of the lanthanide-containing solutions was mixed with an aliquot (about 14 ml) of the polyacrylamide-containing solution to yield an acidic solution having a pH of about 0. Four such acidic samples were prepared, with two of the acidic samples containing lanthanum and the other two containing cerium. The cerium and lanthanum concentrations in the respective samples are set forth below in Table I.

Ammonia gas was then bubbled into each of the four acidic samples. In one case a sufficient amount of ammonia was bubbled in to raise the pH of the sample to about 1.5 and the condition of the sample was examined. In another portion of the experiment, the ammonia gas was bubbled in until the sample completely gelled. (As used in the specification and claims, the terms "completely gelled," "gel completely formed," and "complete gel" mean that additional bubbling of ammonia gas into the sample does not further increase the gel quality of the sample.) The pH of the completely gelled sample and the quality of the resulting gel were then determined. All the results noted in this paragraph are also listed in the following Table I.

TABLE I

| Ex. | Crosslinking Agent | Concentration In Acidic Solution, ppm | Final pH | Appearance |
|---|---|---|---|---|
| 1 | Ce | 239 | 1.5 | No gelation yet |
| 2 | Ce | 239 | 12 | 5[a] |
| 3 | La | 255 | 1.5 | No gelation yet |
| 4 | La | 255 | 11 | 5— |

[a]The samples evaluated in Examples 1-4 of Table I and throughout the remaining examples were visually rated according to the Gel Quality Rating Key set forth in the following Table II.

TABLE II

| Gel Quality Rating Key | |
|---|---|
| 5 | Rigid Gel |
| 4 | Elastic Gel |
| 3 | Weak Gel |
| 2 | Viscous Fluid |
| 1 | Water-like Fluid |

The results shown in Table I indicate that cerium and lanthanum, two exemplary lanthanides, are capable of crosslinking polyacrylamide, an exemplary crosslinkable polymer, to form very good gels.

EXAMPLES 5-16

Crosslinking Hydroxypropyl Guar (HPG)

This series of examples demonstrates that HPG crosslinks when a lanthanide is used as a crosslinking agent. In particular, tap water was mixed with distilled water to obtain stock water comprising about 35 volume percent tap water. A stock lanthanum concentrate was obtained by mixing about 5 ml concentrated hydrochloric acid (about 37.5 weight percent hydrochloric acid) and about 94.023 ml of the stock water and then adding about 0.977 g lanthanum oxide to the resulting solution. The stock lanthanum concentrate contained about 3,750 ppm lanthanum. Similar procedures were used to obtain stock glutaric acid sequestered lanthanum and stock iminodiacetic acid sequestered lanthanum concentrates. In particular, the stock glutaric acid sequestered lanthanum concentrate was formed by mixing about 5 ml concentrated hydrochloric acid with about 91.863 ml stock water. To the resulting solution were sequentially added about 0.977 g lanthanum and about 2.16 g glutaric acid. For the stock iminodiacetic acid sequestered concentrate, about 5 ml concentrated hydrochloric acid was mixed with about 91.823 ml stock water and about 0.977 g lanthanum and about 2.2 g iminodiacetic acid were sequentially added to the resulting solution. Both sequestered lanthanum concentrates contained about 3,750 ppm lanthanum and had a sequestering agent-lanthanum molar ratio of about 6:1. A stock HPG solution containing about 10,000 ppm HPG was prepared by adding a sufficient amount of HPG-102 brand HPG (obtained from Aqualon Co.) to an aliquot of the stock water. As shown below in Table III, varying amounts of the stock lanthanum or stock sequestered lanthanum concentrate were combined with about 12 ml of the stock HPG solution and a sufficient amount of the stock water to yield about 15 ml of each listed acidic solution. The final lanthanum concentration in each acidic solution is also noted in Table III.

The resulting sequestered or unsequestered lanthanum- and HPG-containing acidic solutions were allowed to sit at room temperature and periodically visually examined. On the twelfth day ammonia gas was bubbled into each sample. The results of this experiment are shown in the following Table III.

TABLE III

| | Lanthanum | | Elapsed Time, Days | | | | |
|---|---|---|---|---|---|---|---|
| | | | 1 | | 11 | | 12[a] |
| Ex. | ml | ppm | pH | Rating | pH | Rating | pH | Rating |
| Unsequestered Lanthanum | | | | | | | | |
| 5 | 0.5 | 125 | 1.7 | 1+ | 1.6 | 1+ | 10 | 5 |
| 6 | 1.0 | 250 | 1.5 | 1+ | 1.5 | 1+ | 10 | 5 |
| 7 | 2.0 | 500 | 1.3 | 1+ | 1.2 | 1+ | 10 | 4+ |
| 8 | 3.0 | 750 | 1.3 | 1 | 1.1 | 1+ | 10 | 4+ |
| Glutaric Acid Sequestered Lanthanum | | | | | | | | |
| 9 | 0.5 | 125 | 4.7 | 1+ | 4.6 | 1+ | 10 | 4— |
| 10 | 1.0 | 250 | 4.4 | 1+ | 4.4 | 1+ | 10 | 5 |
| 11 | 2.0 | 500 | 4.4 | 1+ | 4.1 | 1+ | 10 | 4+ |
| 12 | 3.0 | 750 | 4.2 | 1+ | 4.3 | 1+ | 10 | 4+ |
| Iminodiacetic Acid Sequestered Lanthanum | | | | | | | | |
| 13 | 0.5 | 125 | 5.4 | 1+ | 5.1 | 1+ | 10 | 4+ |
| 14 | 1.0 | 250 | 3.9 | 1+ | 4.1 | 1+ | 10 | 4+ |
| 15 | 2.0 | 500 | 3.4 | 1+ | 3.5 | 1+ | 10 | 2— |
| 16 | 3.0 | 750 | 3.4 | 1+ | 3.0 | 1+ | 9.5 | 2— |

[a]The acidic solutions were bubbled with ammonia gas on day 12.

The results shown in the above Table III indicate that no gelling took place in either sequestered or unsequestered lanthanum containing samples until the pH was raised on day 12.

EXAMPLES 17-36

Determination of Optimum Lanthanide and Polymer Concentrations

The following experiments were conducted to determine the optimum HEC and lanthanum concentrations for forming gels. A stock potassium chloride solution was prepared by dissolving a sufficient quantity of potassium chloride in distilled water for the resulting solution to contain about 2 weight percent potassium chloride. To make a stock HEC solution, a sufficient amount of Natrosol 250 HHR brand HEC (manufactured by Hercules Inc. and having a MS of about 2.5) was dissolved in an aliquot of the potassium chloride stock solution for the HEC stock solution to contain about 10,000 ppm HEC. A stock lanthanum concentrate was made by mixing about 5 ml concentrated hydrochloric acid and about 94.023 ml of the stock potassium chloride solution and then adding about 0.977 g lanthanum oxide to the resulting solution. The stock lanthanum concentrate contained about 3,750 ppm lanthanum.

Various amounts of the lanthanum stock concentrate were mixed with the different amounts of the stock HEC and potassium chloride solutions to form the samples listed in Table IV below. The initial pH of each acidic solution was taken and then ammonia gas was bubbled in until a gel completely formed. The initial pH, the pH when gelation was complete, and the gel ratings over time for each sample are recorded in the following Table IV.

TABLE IV

| Ex. | HEC, ppm | La, ppm | Initial pH | Final pH | Days | | | |
|---|---|---|---|---|---|---|---|---|
| | | | | | 1 | 2 | 3 | 6 |
| 17 | 2500 | 125 | 1.8 | 11.2 | 2+ | 2+ | 2 | 2— |
| 18 | 2500 | 250 | N/T[a] | 11.0 | 2— | 2— | 2+ | 2— |
| 19 | 2500 | 500 | N/T | 10.8 | 2— | 2— | 2+ | 2— |
| 20 | 2500 | 750 | 1.5 | 10.5 | 2— | 2— | 2 | 2— |
| 21 | 3000 | 125 | 2.2 | 10.5 | 3— | 3— | 3— | 3— |
| 22 | 3000 | 250 | 1.7 | 10.5 | 3+ | 3+ | 3— | 3— |
| 23 | 3000 | 500 | 1.5 | 10.0 | 3+ | 3+ | 3— | 3— |
| 24 | 3000 | 750 | 1.3 | 10.5 | 3— | 3— | 2— | 2— |
| 25 | 4000 | 125 | 2.2 | 10.7 | 4+ | 3+ | 3— | 3— |
| 26 | 4000 | 250 | 2.0 | 10.5 | 4+ | 3+ | 3— | 3— |
| 27 | 4000 | 500 | 1.5 | 10.0 | 4+ | 4— | 3— | 2+ |
| 28 | 4000 | 750 | 1.3 | 10.2 | 3— | 3— | 3— | 2+ |
| 29 | 5000 | 125 | 2.2 | 10.5 | 4+ | 4+ | 4+ | 4— |
| 30 | 5000 | 250 | N/T | 10.5 | 4+ | 4++ | 4++ | 4+ |
| 31 | 5000 | 500 | N/T | 9.6 | 4+ | 4+ | 4++ | 4+ |
| 32 | 5000 | 750 | 1.5 | 9.7 | 4+ | 4+ | 4+ | 4— |
| 33 | 7500 | 125 | 2.2 | 10.2 | 4+ | 4+ | 4++ | 4+ |
| 34 | 7500 | 250 | N/T | 10.0 | 4++ | 5— | 5— | 5— |
| 35 | 7500 | 500 | N/T | 10.0 | 4++ | 4++ | 5— | 5— |
| 36 | 7500 | 750 | 1.5 | 9.6 | 4+ | 4++ | 5— | 5— |

[a]N/T means not taken.

The data set forth in the above Table IV indicate that the best gels are prepared when the HEC concentration in the solution is at least about 5,000 ppm.

EXAMPLES 37-42

Effect of Gel Breakers on Gel Stability

In this group of experiments the effect of an enzyme and a free radical generator on the quality and stability of gels was determined. The stock potassium chloride solution, the stock HEC solution, and the stock lanthanum solution described in Examples 17-36 were also used in the present Examples 37-42. In addition, a stock HPG solution containing about 10,000 ppm HPG was prepared by dissolving a sufficient quantity of HPG-102 brand HPG in an aliquot of the stock potassium chloride solution. A stock enzyme gel breaker solution containing about 1 weight percent enzyme was prepared by mixing a sufficient quantity of an enzyme gel breaker in an aliquot of the potassium chloride stock solution. In addition, a stock persulfate solution containing about 1 weight percent sodium persulfate was prepared by mixing enough sodium persulfate with another aliquot of the stock potassium chloride solution.

An aliquot of the HEC or HPG stock solution was mixed with an aliquot of the lanthanum stock solution and, except for the controls, with about a 100 μl aliquot of either the enzyme or persulfate gel breaker stock solution to form the samples listed below in Table V. The samples were bubbled with sufficient ammonia gas to form a complete gel or for a two minute period, whichever came first. The initial pH of each sample, the pH of each sample after bubbling, the initial gel rating, and the gel rating after the samples were stored for four days at room temperature are set forth in the following Table V.

TABLE V

| Ex. | HEC, ppm | Gel Breaker | La, ppm | pH Initial | pH Final | Gel Rating, Day 1 | Gel Rating, Day 4 |
|---|---|---|---|---|---|---|---|
| 37 | 8000 | Enzyme | 500 | 1.5 | 10.3 | 3— | 1 |
| 38 | 8000 | Persulfate | 500 | 1.5 | 10.5 | 1 | 1 |
| 39 | 8000 | None | 500 | 1.3 | 10.5 | 5+ | 5— |

| | HPG, | Gel | La, | pH | | Gel Rating, Day | |

TABLE V-continued

| Ex. | ppm | Breaker | ppm | Initial | Final | 1 | 4 |
|---|---|---|---|---|---|---|---|
| 40 | 8000 | Enzyme | 500 | 1.5 | 10.3 | 2− | 1 |
| 41 | 8000 | Persulfate | 500 | 1.5 | 8.8 | 4++ | 1 |
| 42 | 8000 | None | 500 | 1.3 | 10.0 | 5+ | 5− |

The gel ratings noted in the above Table V indicate that the addition of a gel breaker when forming an acidic solution of the present invention reduces the stability of the gel. In addition, the gel quality rating of 1 obtained in Examples 37-38 and 40-41 shows that HEC and HPG gels break very cleanly, even at room temperature, when an enzyme and sodium persulfate gel breakers are used.

EXAMPLES 43-63

Effect of Post Gelation Added Gel Breakers on Gel Stability

In this set of experiments the effect of adding an enzyme after gelation on the stability of a gel was investigated. The stock potassium chloride solution, the stock HEC solution, and the stock lanthanum concentrate described in Examples 17-36, and the stock enzyme gel breaker solution prepared in Examples 37-42 were also used in the present Examples 43-63.

A series of aliquots of the HEC stock solution were mixed with a corresponding series of aliquots of the lanthanum stock solution and ammonia was bubbled through each resulting sample to form complete gels. After gelation, about 100 μl of the 1 weight percent enzyme stock solution was added to each gel, except for the controls. Prior to adding the stock enzyme solution to the gels, each sample was stored for about two days at room temperature. After the addition of the enzyme stock solution, all the enzyme-containing gels and the controls were stored at the various temperatures noted in the following Table VI. Table VI also lists the gel rating of each gel during the course of these experiments.

TABLE VI

| Ex. | HEC, ppm | La, ppm | Day 1 | Day 2 | Enzyme Added Here | Storage Temp. °F. | Hours, 1 | 2 | 3 | 4 | 21 |
|---|---|---|---|---|---|---|---|---|---|---|---|
| 43 | 4545 | 227 | 4+ | 4+ | No | 100 | 3+ | 3− | 3− | 3− | 3− |
| 44 | 4545 | 454 | 4+ | 4+ | No | 100 | 3 | 3− | 3− | 3− | 2+ |
| 45 | 4545 | 227 | 4+ | 4+ | Yes | 75 | 3− | 3− | 3− | 3− | 3− |
| 46 | 4545 | 454 | 4+ | 4+ | Yes | 75 | 3− | 3− | 3− | 2+ | 2− |
| 47 | 4545 | 227 | 5− | 4+ | Yes | 100 | 3− | 2− | 1+ | 1+ | 1 |
| 48 | 4545 | 454 | 4+ | 4+ | Yes | 100 | 2− | 2− | 1+ | 1+ | 1 |
| 49 | 4545 | 227 | 4+ | 4+ | Yes | 125 | 1 | 1 | 1 | 1 | 1 |
| 50 | 4545 | 454 | 4+ | 3− | Yes | 125 | 1+ | 1 | 1 | 1 | 1 |
| 51 | 2500 | 125 | 2− | 2− | Yes | 160 | 2− | 2− | 2− | 2− | 1 |
| 52 | 2500 | 250 | 2− | 2− | Yes | 160 | 2− | 2− | 2− | 2− | 1 |
| 53 | 2500 | 500 | 2− | 2− | Yes | 160 | 2− | 2− | 2− | 2− | 1+ |
| 54 | 2500 | 750 | 2− | 2− | Yes | 160 | 1+ | 1 | 1 | 1 | 1 |
| 55 | 5000 | 125 | 4− | 4− | Yes | 160 | 3− | 2+ | 2− | 1+ | 1 |
| 56 | 5000 | 250 | 4+ | 4+ | Yes | 160 | 3− | 2− | 2− | 1+ | 1 |
| 57 | 5000 | 500 | 4+ | 4+ | Yes | 160 | 3− | 2− | 2− | 2− | 1 |
| 58 | 5000 | 750 | 4− | 4− | Yes | 160 | 2− | 2− | 2− | 2− | 1 |
| 59 | 7500 | 125 | 4+ | 4+ | Yes | 160 | 3 | 3− | 2− | 1 | 1 |
| 60 | 7500 | 250 | 5− | 5− | Yes | 160 | 3+ | 3− | 2− | 1+ | 1 |
| 61 | 7500 | 500 | 5− | 5− | Yes | 160 | 3− | 2+ | 2+ | 2− | 1 |
| 62 | 7500 | 750 | 5− | 5− | Yes | 160 | 3− | 2+ | 2+ | 2− | 1 |
| 63 | 8000 | 500 | 5+ | 5+ | No | 160 | 5− | 5− | 5− | 5− | 1 |

The data in the above Table VI indicate that the post gelation addition of an enzyme gel breaker degrades gels, the effect being more significant at higher temperatures. In addition, the results of the control samples shown in Table VI demonstrate that HEC gels self-degrade at about 100° F. or greater.

EXAMPLES 64-75

Effect of Temperature and Post Gelation Addition of Gel Breakers on Gel Stability In this group of experiments the effect of temperature as well as an enzyme and a free radical generator on gel stability was determined. The stock HEC solution and the stock lanthanum concentrate employed in 17-36 were used to formulate acidic solution samples containing about 5,000 ppm HEC and about 500 ppm lanthanum. Complete gels were formed by bubbling ammonia gas through each sample. About 100 μl of the enzyme or persulfate gel breaker stock solution of Examples 37-42, when employed, was added after forming the complete gel. The initial pH of each acidic solution was about 1.3 and the pH at which complete gelation occurred ranged between about 9.5 and about 10. The initial gel ratings, storage temperatures, and gel ratings during storage are shown in the following Table VII.

TABLE VII

| Ex. | Gel Breaker | Storage Temp., °F. | Hours Stored, 0 | 1 | 2 | 3 | 4 | 5 | 6 | 8 | 24 |
|---|---|---|---|---|---|---|---|---|---|---|---|
| 64 | None | 75 | 3+ | 2+ | 2+ | 2+ | 2+ | 2 | 2 | 2 | 2− |
| 65 | None | 100 | 3+ | 4+ | 4− | 3+ | 3− | 3− | 4− | 2+ | 2− |
| 66 | None | 125 | 3+ | 2− | 2− | 2− | 2− | 2− | 2− | 1+ | 1+ |
| 67 | None | 160 | 3+ | 2− | 2− | 1+ | 1+ | 1+ | 1+ | 1 | 1 |
| 68 | Enzyme | 75 | 3+ | 2− | 2− | 2− | 1+ | 1+ | 1+ | 1+ | 1+ |
| 69 | Enzyme | 100 | 3+ | 1+ | 1+ | 1+ | 1+ | 1+ | 1+ | 1 | 1 |
| 70 | Enzyme | 125 | 3+ | 1+ | 1 | 1 | 1 | 1 | 1 | 1 | 1 |
| 71 | Enzyme | 160 | 3+ | 1 | 1 | 1 | 1 | 1 | 1 | 1 | 1 |
| 72 | Persulfate | 75 | 3+ | 2− | 2− | 2− | 1+ | 1+ | 1+ | 1+ | 1+ |

TABLE VII-continued

| Ex. | Gel Breaker | Storage Temp., °F. | Hours Stored, |  |  |  |  |  |  |  |  |
|---|---|---|---|---|---|---|---|---|---|---|---|
|  |  |  | 0 | 1 | 2 | 3 | 4 | 5 | 6 | 8 | 24 |
| 73 | Persulfate | 100 | 3+ | 1+ | 1+ | 1+ | 1+ | 1+ | 1+ | 1+ | 1 |
| 74 | Persulfate | 125 | 3+ | 2− | 1+ | 1+ | 1+ | 1+ | 1 | 1 | 1 |
| 75 | Persulfate | 160 | 3+ | 1 | 1 | 1 | 1 | 1 | 1 | 1 | 1 |

The results set forth in the above Table VII indicate that the degradation of HEC gels by the enzyme gel breaker and the sodium persulfate gel breaker is comparable.

EXAMPLES 76–83

Effect of Temperature and Pregelation Addition of Gel Breakers on Gel Stability

In these experiments the procedure employed in formulating the gels of Examples 64–75 was repeated with one modification, namely, the gel breaker, when used, was added to the sample prior to gelation. The gels were stored at various temperatures for about 20 hours. At about the 20th hour, all the samples were stored at about 115° F. The results of this group of experiments are summarized in the following Table VIII.

TABLE VIII

| Ex. | Gel Breaker | Storage Temp., °F. | Hours, |  |  |  |  | Storage Temp., °F. | Hours, |  |
|---|---|---|---|---|---|---|---|---|---|---|
|  |  |  | 0 | 1 | 2 | 18 | 20 |  | 1 | 3 |
| 76 | None | 75 | 4+ | 4+ | 4+ | 4− | 4− | 115 | 2− | 1+ |
| 77 | None | 100 | 4+ | 4+ | 4− | 2 | 2 | 115 | 1+ | 1+ |
| 78 | None | 125 | 4+ | 4− | 3 | 1+ | 1 | 115 | 1 | 1 |
| 79 | None | 130 | 4+ | 3+ | 3− | 1+ | 1 | 115 | 1 | 1 |
| 80 | Enzyme | 75 | 4− | 3++ | 3+ | 3− | 3 | 115 | 1+ | 1+ |
| 81 | Enzyme | 100 | 4− | 4− | 3− | 2− | 1+ | 115 | 1+ | 1+ |
| 82 | Persulfate | 75 | 4 | 3++ | 3 | 4 | 3− | 115 | 1+ | 1+ |
| 83 | Persulfate | 100 | 4 | 4− | 3− | 2− | 2− | 115 | 1+ | 1+ |

The results shown in above Table VIII reinforce the conclusions drawn from the data set forth in Table VII, supra. In addition, the data listed in Table VIII indicate that the presence of a gel breaker does not prevent the formation of good gels.

EXAMPLES 84–86

Effect of Sequestering Agents on the Gelation of HPG

To determine the effect of sequestering agents on the gelation of HPG, an aliquot (about 3 ml) of the stock sequestered lanthanum concentrate described in Examples 9–16 was mixed with an aliquot (about 6 ml) of the stock HPG solution and an aliquot (about 6 ml) of the stock water of Examples 5–16. In the case of the control, an aliquot (about 3 ml) of the stock lanthanum concentrate of Examples 5–8 was employed in place of the stock sequestered lanthanum concentrate. Each of the samples contained about 8,000 ppm HPG and about 750 ppm lanthanum. Table IX sets forth the initial gel ratings, the initial pHs, the gel rating after the samples were bubbled with ammonia for a sufficient time to raise the sample pH to about 9, and the gel rating about 24 hours after the ammonia bubbling was stopped.

TABLE IX

| Ex. | Sequestering Agent | Initial Gel Rating | pH | Gel Rating After Bubbling With Ammonia | Gel Rating 24 Hours After Bubbling With Ammonia |
|---|---|---|---|---|---|
| 84 | None | 1+ | 1.2 | 5+ | 5+ |
| 85 | Glutaric Acid | 1+ | 3.6 | 3+ | 4++ |
| 86 | Iminodiacetic Acid | 1+ | 3.1 | 1+ | 5− |

The results of Table IX indicate that HPG gels in the presence of a sequestering agent. In addition, as shown in Example 86, the sequestering agent occasionally acts to delay the onset of gelation.

EXAMPLES 87–88

Effect of Sequestering Agent on Gelation of HEC

To determine the effect of a sequestering agent on the gelation of HEC, a stock HEC solution containing about 10,000 ppm HEC was prepared by adding a sufficient amount of Natrosol 250 brand HEC to an aliquot of the stock water of Examples 5–16. An aliquot (about 3 ml) of the iminodiacetic stock sequestered lanthanum concentrate described in Examples 13–16 was mixed with an aliquot (about 6 ml) of the stock HEC solution and an aliquot (about 6 ml) of the stock water of Examples 5–16. In the case of the control, an aliquot (about 3 ml) of the stock lanthanum concentrate of Examples 5–8 was employed in place of the stock sequestered lanthanum concentrate. Each of the samples contained about 8,000 ppm HEC and about 750 ppm lanthanum. Table X sets forth the initial pHs, the initial gel ratings, the pHs when either a complete gel formed or at about two minutes after ammonia bubbling commenced (whichever came first), and the gel ratings over a period of time while storing the gels at about 75° F.

TABLE X

| Ex. | Sequestering Agent | Bubbling With Ammonia Before |  | After | Gel Rating Days |  |  |  |  |
|---|---|---|---|---|---|---|---|---|---|
|  |  | Gel Rating | pH | pH | 1 | 2 | 3 | 6 | 7 |
| 87 | None | 1+ | 1.5 | 9.6 | 4+ | 4++ | 5− | 5− | 5− |
| 88 | Iminodiacetic | 1+ | 3.5 | 10.5 | 1+ | 3− | 3− | 4++ | 4++ |

TABLE X-continued

| | | Bubbling With Ammonia | | | | | |
|---|---|---|---|---|---|---|---|
| | Sequestering | Before | After | Gel Rating Days | | | |
| Ex. | Agent | Gel Rating pH | pH | 1 | 2 3 | 6 | 7 |
| | Acid | | | | | | |

The results of Table X indicate that a HEC gels in the presence of a sequestering agent. In addition, Example 88 shows that the sequestering agent iminodiacetic acid acts to delay the onset of gelation.

Although the present invention has been described in considerable detail with reference to some preferred versions, other versions are possible. For example, the solutions of the present invention are employable in the selective subterranean water permeability modification techniques disclosed in U.S. Pat. No. 5,145,012 incorporated herein in its entirety by reference. Polyacrylamides are also the preferred polymers for the solutions of the present invention when used in those selective subterranean water permeability modification techniques. Therefore, the spirit and scope of the appended claims should not necessarily be limited to the description of the preferred versions contained herein.

What is claimed is:

1. A method for inhibiting the migration of a hazardous acid plume through a subterranean stratum, the method comprising the step of injecting into at least a portion of the acid plume a slug of a composition capable of forming a gel, the composition comprising:
   (a) a crosslinkable polymer; and
   (b) a lanthanide.

2. The method of claim 1 wherein the crosslinkable polymer is selected from the group consisting of polyvinyl polymers, cellulose ethers, polysaccharides, lignosulfonates, ammonium salts thereof, alkali metal salts thereof, and alkaline earth salts of lignosulfonates.

3. The method of claim 1 wherein the crosslinkable polymer is selected from the group consisting of acrylic acid-acrylamide copolymers, acrylic acid-methacrylamide copolymers, polyacrylamides, polymethacrylamides, partially hydrolyzed polyacrylamides, partially hydrolyzed polymethacrylamides, polyvinyl alcohol, polyvinyl acetate, polyvinyl pyrrolidone, polyalkyleneoxides, carboxyalkylhydroxyethyl celluloses, hydroxyethylcellulose, galactomannans, hydroxypropyl guar, heteropolysaccharides obtained by the fermentation of starch-derived sugar, and ammonium and alkali metal salts thereof.

4. The method of claim 1 wherein the crosslinkable polymer is selected from the group consisting of polyacrylamide and copolymers of acrylamide and (A) acrylic acid, (B) vinyl pyrrolidone, (C) sodium 2-acrylamido-2-methylpropane sulfonate, and (D) mixtures of (A), (B), and (C).

5. The method of claim 1 wherein the crosslinkable polymer is present in the composition in a concentration of at least about 1,000 ppm.

6. The method of claim 1 wherein the crosslinkable polymer is present in the composition in a concentration of about 1,000 to about 10,000 ppm.

7. The method of claim 1 wherein the lanthanide is selected from the group consisting of lanthanum, cerium, and mixtures thereof.

8. The method of claim 1 wherein the lanthanide concentration in the composition is at least about 10 ppm.

9. The method of claim 1 wherein the composition has a pH less than about 5.

10. A method for inhibiting the migration of a hazardous acid plume through a subterranean formation, the method comprising the steps of:
    (A) injecting a slug of a composition capable of forming a gel into at least a portion of the subterranean formation not contacted by the acid plume but in the migration path of the acid plume, the composition comprising:
       (a) a crosslinkable polymer; and
       (b) a lanthanide; and
    (B) allowing the gel to inhibit the migration of the acid plume.

11. The method of claim 10 wherein the composition has a pH greater than about 5.

12. The method of claim 10 wherein the composition further comprises a sequestering agent.

13. The method of claim 10 wherein the composition has a pH greater than about 5 and further comprises a sequestering agent.

14. The method of claim 10 wherein the composition further comprises a sequestering agent and the molar ratio of the sequestering agent to lanthanide in the composition is at least about 1:1.

15. The method of claim 10 wherein the composition has a pH less than about 5.

16. The method of claim 10 wherein the crosslinkable polymer is selected from the group consisting of polyvinyl polymers, cellulose ethers, polysaccharides, lignosulfonates, ammonium salts thereof, alkali metal salts thereof, and alkaline earth salts of lignosulfonates.

17. The method of claim 10 wherein the crosslinkable polymer is selected from the group consisting of acrylic acid-acrylamide copolymers, acrylic acid-methacrylamide copolymers, polyacrylamides, polymethacrylamides, partially hydrolyzed polyacrylamides, partially hydrolyzed polymethacrylamides, polyvinyl alcohol, polyvinyl acetate, polyvinyl pyrrolidone, polyalkyleneoxides, carboxyalkylhydroxyethyl celluloses, hydroxyethylcellulose, galactomannans, hydroxypropyl guar, heteropolysaccharides obtained by the fermentation of starch-derived sugar, and ammonium and alkali metal salts thereof.

18. The method of claim 10 wherein the crosslinkable polymer is selected from the group consisting of polyacrylamide and copolymers of acrylamide and (A) acrylic acid, (B) vinyl pyrrolidone, (C) sodium 2-acrylamido-2-methylpropane sulfonate, and (D) mixtures of (A), (B), and (C).

19. A system for inhibiting the migration of a hazardous acid plume, the system comprising:
    (a) an acid plume present in at least a portion of a subterranean stratum;
    (b) a well bore penetrating at least a portion of the subterranean stratum; and
    (c) a composition present in at least a portion of the well bore, the composition comprising:
       (a) a crosslinkable polymer; and
       (b) a lanthanide.

* * * * *